US006989758B2

(12) United States Patent
Kurosawa

(10) Patent No.: US 6,989,758 B2
(45) Date of Patent: Jan. 24, 2006

(54) ELECTRONIC DEVICE IN WHICH DIFFERENT TYPES OF BATTERIES CAN BE SELECTIVELY USED AS A POWER SOURCE

(75) Inventor: Yuichi Kurosawa, Tokyo (JP)

(73) Assignee: PENTAX Corporation, Tokyo (JP)

( * ) Notice: Subject to any disclaimer, the term of this patent is extended or adjusted under 35 U.S.C. 154(b) by 118 days.

(21) Appl. No.: 10/790,833

(22) Filed: Mar. 3, 2004

(65) Prior Publication Data

US 2004/0229111 A1 Nov. 18, 2004

(30) Foreign Application Priority Data

Mar. 3, 2003 (JP) .............................. 2003-055401

(51) Int. Cl.
*G08B 21/00* (2006.01)
(52) U.S. Cl. .................... 340/636.1; 396/301; 396/539
(58) Field of Classification Search ............ 340/636.1; 320/106, 125, 126; 396/301, 277, 539
See application file for complete search history.

(56) References Cited

U.S. PATENT DOCUMENTS

| 4,645,325 | A | * | 2/1987 | Inoue et al. ................. 396/301 |
| 5,006,881 | A | * | 4/1991 | Kodama ..................... 396/176 |
| 5,164,652 | A | * | 11/1992 | Johnson et al. ............. 320/106 |
| 6,625,401 | B2 | | 9/2003 | Kaedeoka |

FOREIGN PATENT DOCUMENTS

| JP | 2000-019595 | 1/2000 |
| JP | 2002-357863 | 12/2002 |
| JP | 2003-195398 | 7/2003 |
| JP | 2003-259191 | 9/2003 |

OTHER PUBLICATIONS

English Language Abstract of JP2000-019595.
English Language Abstract of JP 2003-195398.
English Language Abstract of JP 2003-259191.

* cited by examiner

*Primary Examiner*—John Tweel, Jr.
(74) *Attorney, Agent, or Firm*—Greenblum & Bernstein, P.L.C.

(57) ABSTRACT

An electronic device includes a battery chamber; first through fifth contacts, positioned in the battery chamber; two detection switches which are turned ON only when two battery packs are accommodated in the battery chamber in the correct direction; a voltage detector capable of detecting first through sixth voltages between the first/second contacts, second/third contacts, third/fourth contacts, fourth/fifth contacts, first/third contacts, and third/fifth contacts, respectively; and a controller which allows either four cylindrical cells or the two battery packs to be used as the power source only if the two detection switches are ON when the fifth and sixth voltages are substantially the same, or if the two detection switches are OFF when the first, second, third and fourth voltages is greater than zero volts and that the first, second, third and fourth voltages are substantially the same.

14 Claims, 10 Drawing Sheets

ELECTRONIC DEVICE IN WHICH DIFFERENT TYPES OF BATTERIES CAN BE SELECTIVELY USED AS A POWER SOURCE

BACKGROUND OF THE INVENTION

1. Field of the Invention

The present invention relates to an electronic device such as an electronic camera which is powered by battery, more specifically, to an electronic device in which different types of batteries can be selectively used as a power source.

2. Description of the Related Art

A cylindrical primary CR-V3 lithium battery (manganese dioxide/lithium battery) which is interchangeable with two AA-size cells (two primary or secondary AA-size cells), has been available on the market in recent years. Furthermore, various cameras for which one or more CR-V3 batteries are available as a power source have been developed in recent years. Primary lithium batteries are high in weight energy density and volume energy density, and are accordingly suitable as a power source for high-power consumption electronic devices such as digital cameras. FIGS. 11 and 12 each show an outward appearance of a CR-V3 battery.

Since the CR-V3 battery is accommodated in a battery chamber, in which two AA-size cells can be accommodated, there is a possibility of one CR-V3 battery and two or more AA-size cells being intentionally or unintentionally accommodated together in a battery chamber of a camera in which four or a larger even number of AA-size cells can be accommodated to serve as a power source of the camera. For example, in a camera using four AA-size cells, there is a possibility of two AA-size cells and one CR-V3 battery being accommodated in the battery chamber and subsequently being used in such a state. Additionally, there is a possibility of four AA-size cells which includes both primary and secondary cells being accommodated in the battery chamber and subsequently being used in such a state.

Accordingly, if either a combination of two or more AA-size primary cells and at least one CR-V3 battery, or a combination of two or more AA-size primary cells and two or more AA-size secondary cells are accommodated together in a battery chamber of a camera which can accommodate at least four or a larger even number of AA-size cells, the AA-size primary cells may be forcibly charged accidentally due to a difference in voltage between the AA-size primary cells and the CR-V3 battery or the AA-size secondary cells, even though the AA-size primary cells are non-rechargeable batteries. If a voltage for battery charging is applied to the AA-size primary cells, the AA-size primary cells may result in battery fluid leak, heat generation, damage and/or explosion, which is dangerous. Such improper use of batteries cannot be sufficiently prevented from occurring even if an instruction manual calls attention to such a danger.

SUMMARY OF THE INVENTION

The present invention has been devised in view of the problems noted above. The present invention provides an electronic device (e.g., a camera) including a battery chamber, in which at least two battery packs of the same type each having a shape interchangeable with two cylindrical cells of the same type can be accommodated so that either the two battery packs or two sets of the two cylindrical cells can be selectively accommodated in the battery chamber, wherein a combination of different types of batteries can be prevented from being accommodated and used as a power source of the electronic device.

According to the present invention, an electronic device for which at least two different types of batteries can be selectively used as a power source is provided, the electronic device-including a battery chamber, in which at least two battery packs of the same type each having a shape interchangeable with two cylindrical cells of the same type can be accommodated so that either the two battery packs or two sets of the two cylindrical cells can be selectively accommodated in the battery chamber, wherein each of the two battery packs includes a positive terminal and a negative terminal which are formed on only one end of the each battery pack, and wherein each of the two cylindrical cells includes a positive terminal and a negative terminal which are respectively formed on opposite ends of the each cylindrical cell; first through fifth contacts, positioned alternately between opposite ends of the battery chamber, in a longitudinal direction of the cylindrical cells or battery packs which are accommodated in the battery chamber, wherein the first through fifth contacts connect the two sets of the two cylindrical cells in series in a case where each of the two sets of the two cylindrical cells is accommodated in the battery chamber in the correct direction, and wherein in the case where the two battery packs are accommodated in the battery chamber, the third contact is in electrical contact with the negative terminal of one of the two battery packs and the positive terminal of the other of the two battery backs while the first contact and the fifth contact are in electrical contact with the positive terminal of the one of the two battery packs and the negative terminal of the other of the two battery backs, respectively; two detection switches which are turned ON only when the two battery packs are accommodated in the battery chamber in the correct direction, respectively; a voltage detector capable of detecting each of a first voltage between the first contact and the second contact, a second voltage between the second contact and the third contact, a third voltage between the third contact and the fourth contact, a fourth voltage between the fourth contact and the fifth contact, a fifth voltage between the first contact and the third contact, and a sixth voltage between the third contact and the fifth contact; and a controller which allows either the two sets of the two cylindrical cells or the two battery packs that are accommodated in the battery chamber to be used as the power source only in one of the following two cases: a first case where both the two detection switches are ON while it is determined via the voltage detector that the fifth voltage and the sixth voltage are substantially the same as each other, and a second case where both the two detection switches are OFF while it is determined via the voltage detector that each of the first voltage, the second voltage, the third voltage and the fourth voltage is greater than zero volts and that the first voltage, the second voltage, the third voltage and the fourth voltage are substantially the same as each other.

The electronic device can include a warning device; and a backup battery provided independently of the two sets of the two cylindrical cells and the two battery packs. In a case other than the first and second cases, the controller issues a warning that inappropriate batteries are accommodated in the battery chamber via the warning device while using the backup battery as a power source, and prohibits the inappropriate batteries from being used as a power source.

The warning device can include a display device. The controller drives the display device to indicate the warning in the case other than the first and second cases.

It is desirable for each cylindrical cell to include an AA-sized cell, and for each battery pack to include a CR-V3 battery.

It is desirable for each of the two detection switches to include a movable switch portion which projects into the battery chamber, the movable switch portion being pressed by a side surface of the associated CR-V3 battery when the associated CR-V3 battery is inserted into the battery chamber.

The electronic device can be a camera.

It is desirable for the battery chamber to be partitioned into a first partition and a second partition, in each of which either the two cylindrical cells or one of the two battery packs can be accommodated. The electronic device can include a battery chamber lid for opening and closing the battery chamber. The second contact and the fourth contact are fixed to an inner surface of the battery chamber lid in a manner to face the first partition and the second partition, respectively, in a closed state of the battery chamber lid.

The battery chamber can be formed in a grip portion of the camera.

Two of the CR-V3 batteries can be accommodated in the battery chamber with respective grooves portions of the two of the CR-V3 batteries facing each other.

In another embodiment, an electronic device for which at least two different types of batteries can be selectively used as a power source is provided, the electronic device including a battery chamber, in which at least two battery packs of the same type each having a shape interchangeable with two cylindrical cells of the same type can be accommodated so that either the two battery packs or two sets of the two cylindrical cells can be selectively accommodated in the battery chamber.

It is desirable for each cylindrical cell to include an AA-sized cell, and for each battery pack to include a CR-V3 battery.

In another embodiment, an electronic device for which at least two different types of batteries can be selectively used as a power source is provided, the electronic device including a battery chamber, in which at least two battery packs of the same type each having a shape interchangeable with two cylindrical cells of the same type can be accommodated so that either the two battery packs or two sets of the two cylindrical cells can be selectively accommodated in the battery chamber; a voltage detector capable of detecting a voltage for each of the two sets of the two cylindrical cells or the two battery packs which are accommodated in the battery chamber; and a determining device which determines that different types of batteries are accommodated in the battery chamber in the case where all of the voltages detected by the voltage detector are not substantially the same.

In a case where the determining device determines that the different types of batteries are accommodated in the battery chamber, it is desirable for the different types of batteries to be prohibited from being used as a power source.

It is desirable for each cylindrical cell to be an AA-sized cell, and for each battery pack to be a CR-V3 battery.

The present disclosure relates to subject matter contained in Japanese Patent Application No.2003-055401 (filed on Mar. 3, 2003) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 2:
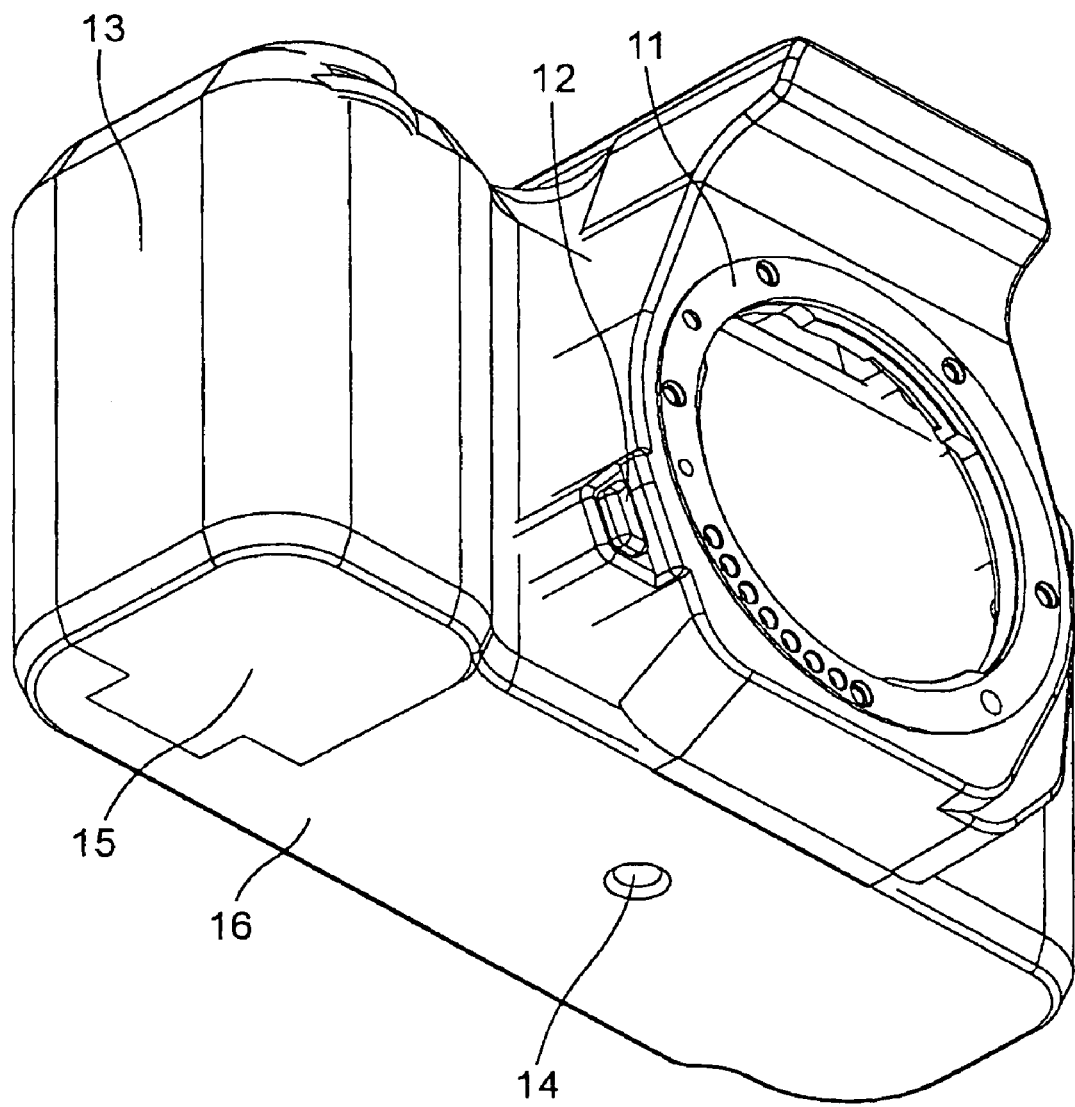
FIG. 2 is a perspective view of the camera body including the battery case and the battery chamber lid which are shown in FIG. 1.
Figure 3:
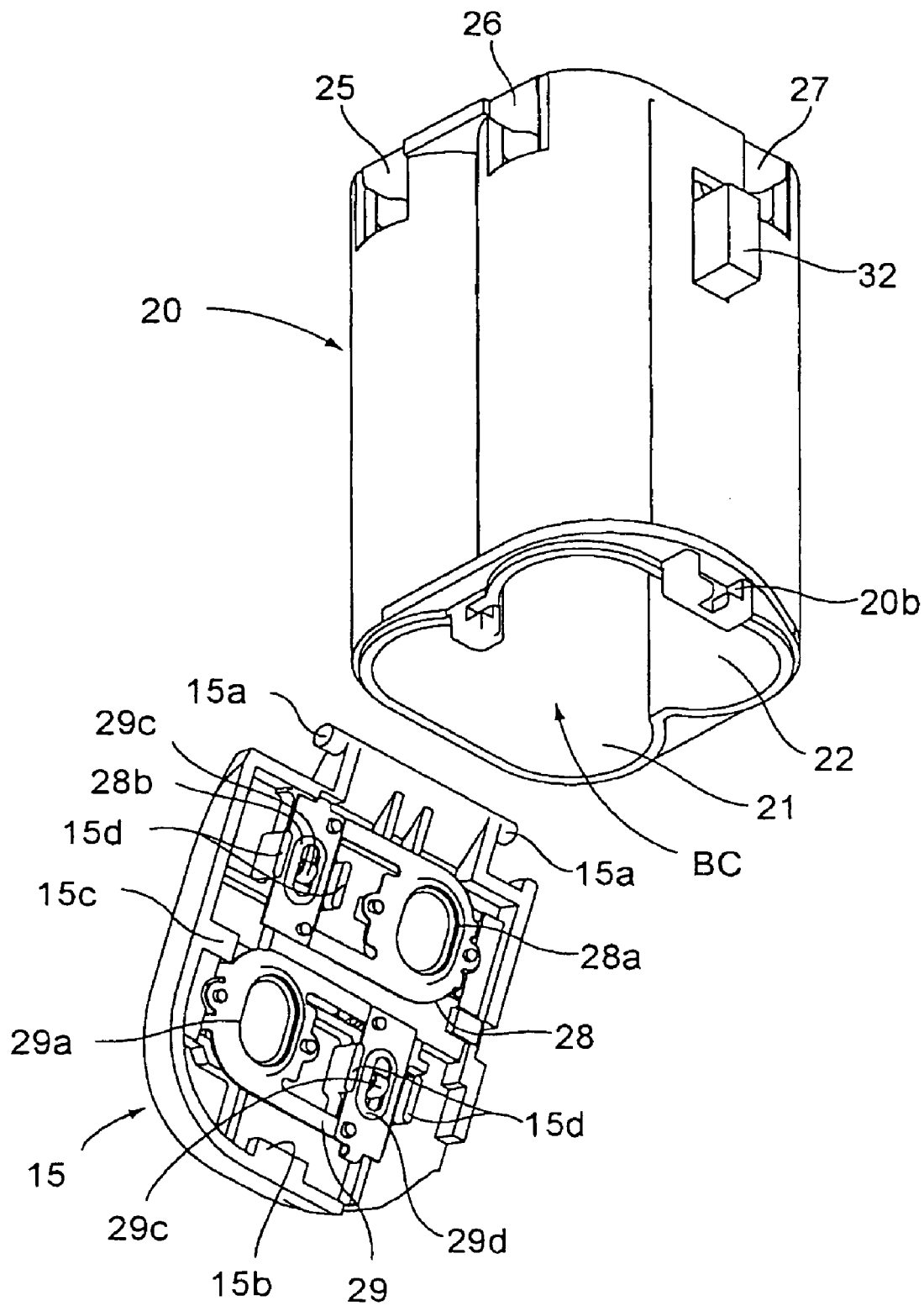
FIG. 3 is a perspective view of the battery case and the battery chamber lid.
Figure 4:
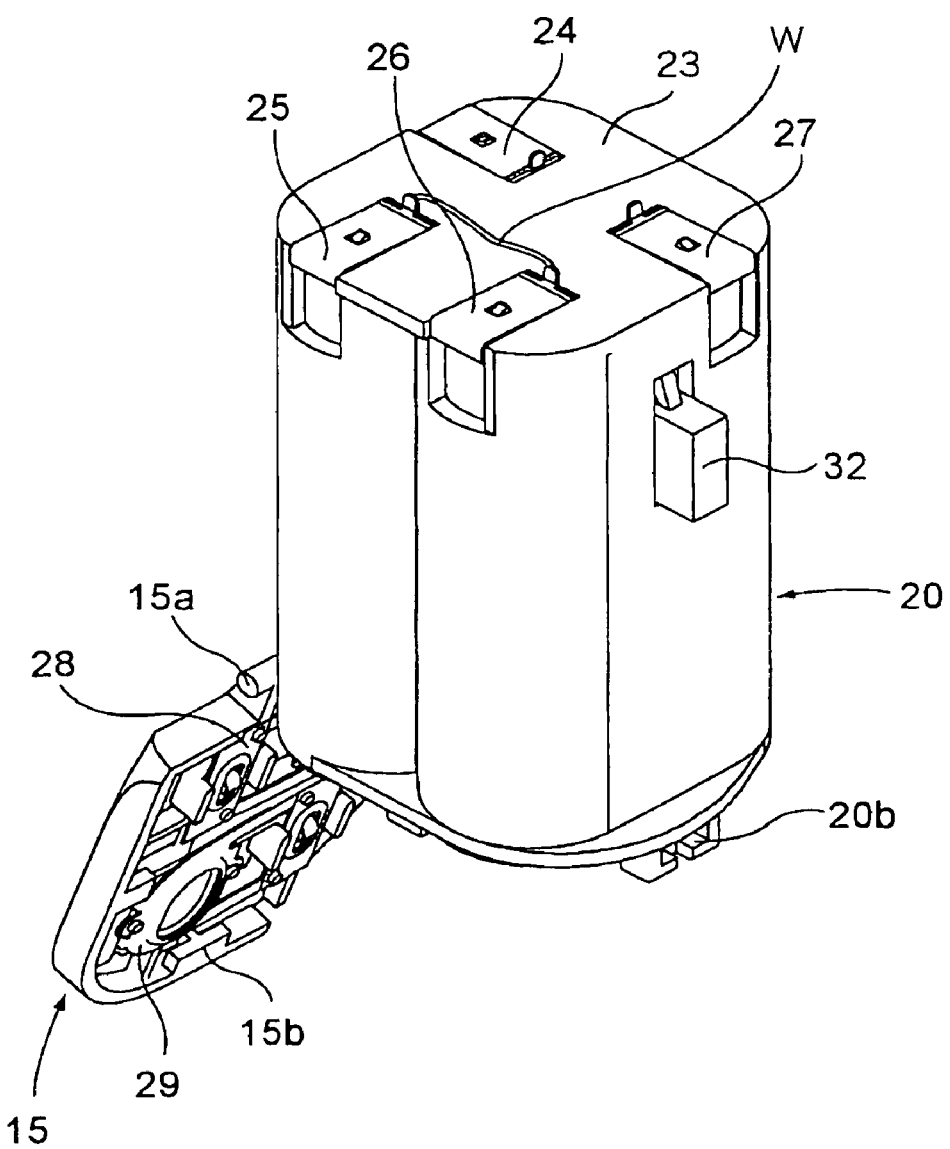
FIG. 4 is a perspective view of the battery case and the battery chamber lid, viewed from a different angle.
Figure 5:
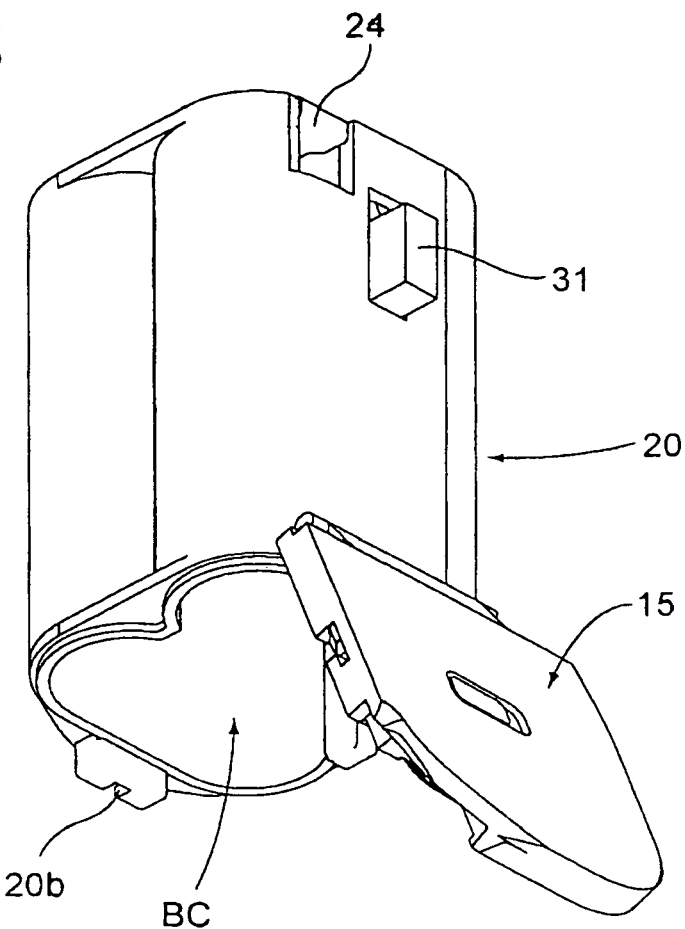
FIG. 5 is a perspective view of the battery case and the battery chamber lid, viewed from a different angle.
Figure 9:
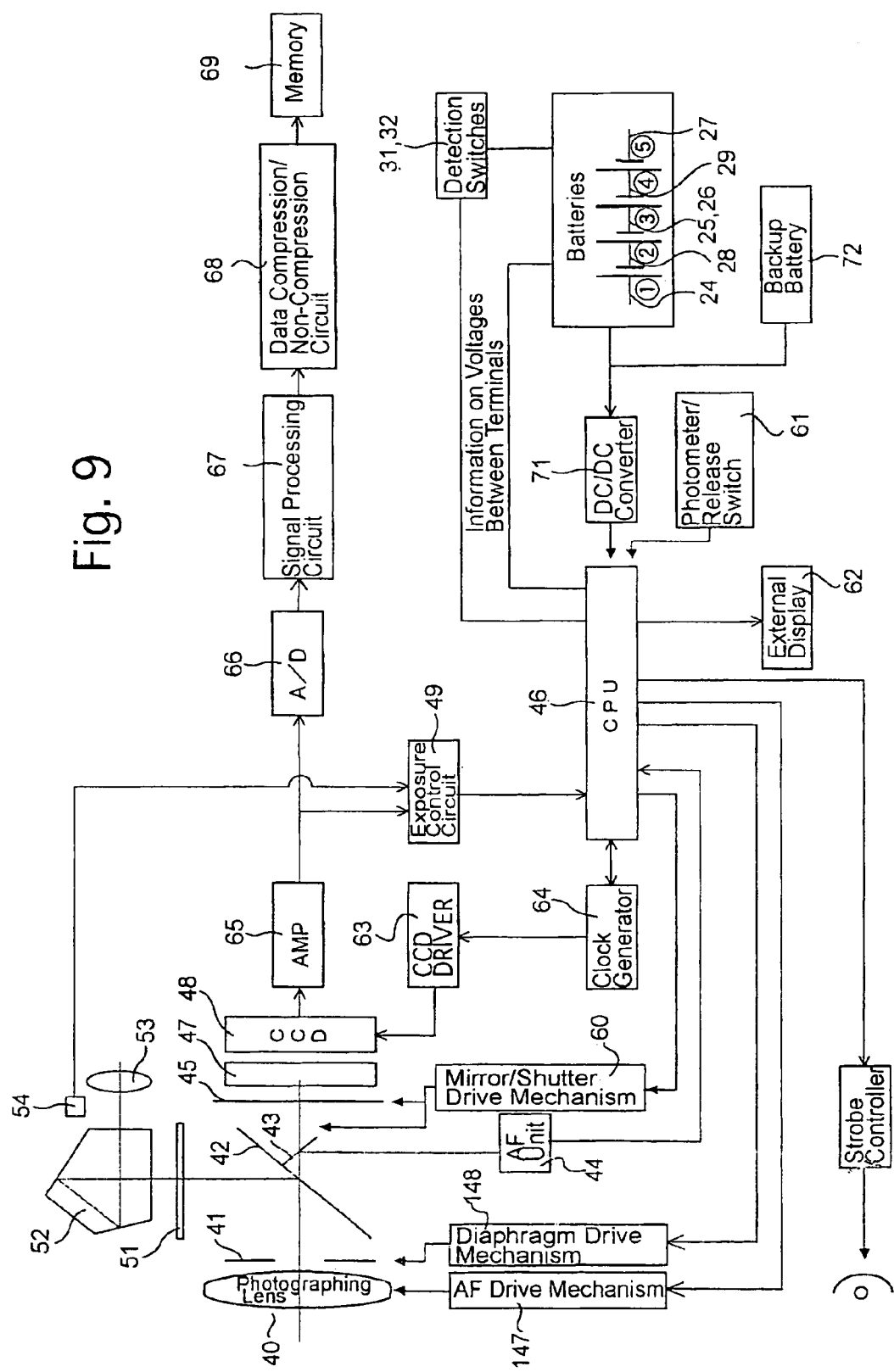
FIG. 9 is a schematic block diagram of components of the camera body shown in FIG. 2.

FIG. 2 shows a camera body to which the present invention is applied, and FIG. 9 shows components of the camera body shown in FIG. 2. The camera body 10 is that of an SLR type AF digital camera system. The camera body 10 is provided on a front surface thereof with a mount ring 11 to which an interchangeable photographing lens 40 (see FIG. 9; not shown in FIG. 2) is detachably attached. The camera body 10 is provided in the vicinity of the mount ring 11 with a lens-lock-release button 12 which is depressed when the photographing lens 40 is removed.

The camera body 10 is provided, on a left side portion thereof as viewed from front of the camera body 10, with a grip portion 13, and is provided on top of the grip portion 13 with a release button (not shown). The camera body 10 is provided, on a bottom surface thereof at an approximate center of the bottom surface, with a tripod socket (female screw hole) 14, and is provided at the bottom of the grip portion 13 with a battery chamber lid (battery chamber cover) 15 for opening and closing a battery chamber BC of the camera body 10.

The camera body 10 is provided in the grip portion 13 with a stationary battery case 20. FIGS. 1, 3, 4 and 5 show the battery case 20 and the battery chamber lid 15 which constitute the battery chamber BC. The battery case 20 is a tubular case whose top end and bottom end are closed and open, respectively, and is formed so that either four AA-size cells (each designated by "AA" in the drawings) or two CR-V3 batteries (battery packs) (each designated by "CR- V3 " in the drawings) can be accommodated in the battery chamber BC in the battery case 20. An approximately upper half of the battery chamber BC is partitioned into two partitions: a first partition 21 and a second partition 22 by a partition wall 20a (see FIGS. 1, 6 and 8). The partition wall 20a is positioned in the battery chamber BC is formed integral with the battery case 20, and extends in a vertical direction of the camera body 10. Either two AA-size cells or one CR-V3 battery can be inserted into each of the first partition 21 and the second partition 22.

Figure 6:
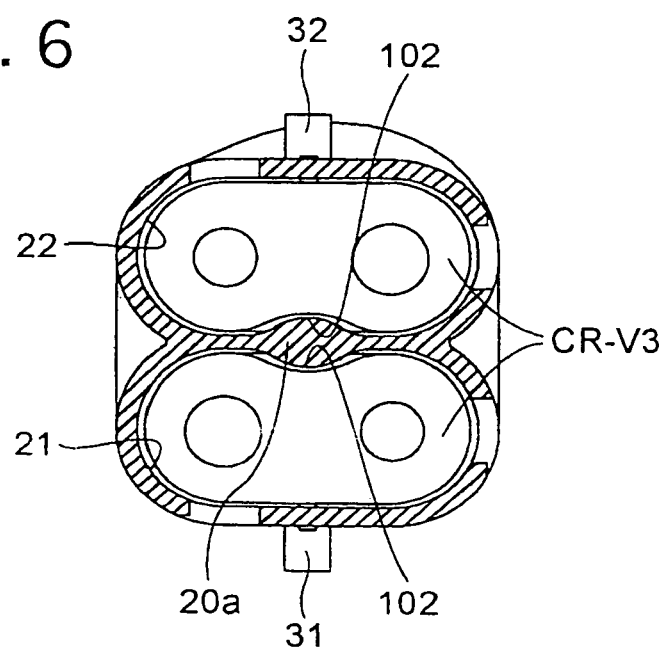
FIG. 6 is a cross sectional view of the battery case, viewed from above the battery case, showing a state where two CR-V3 batteries are accommodated in the battery chamber.
Figure 7:
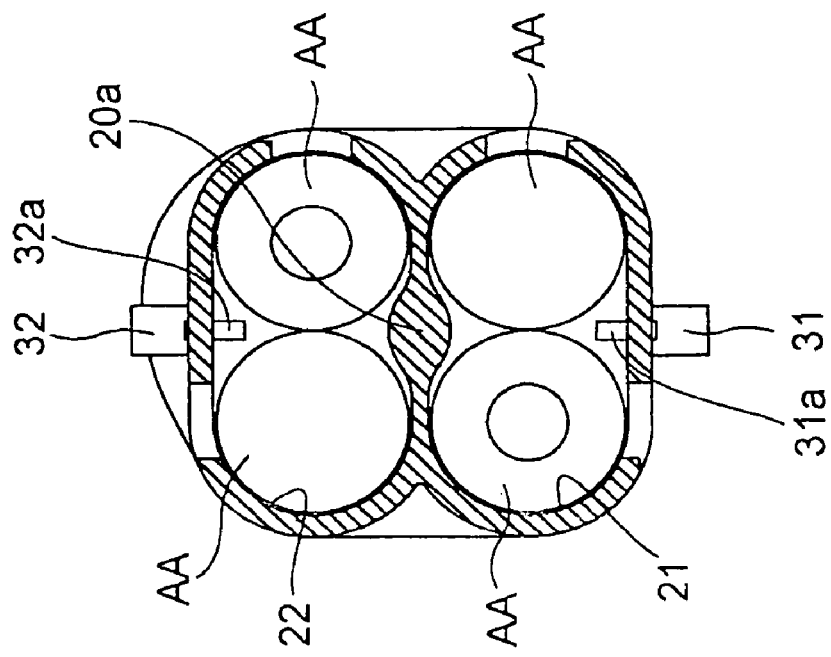
FIG. 7 is a cross sectional view of the battery case, viewed from above the battery case, showing a state where four AA-size cells are accommodated in the battery chamber.
Figure 11:
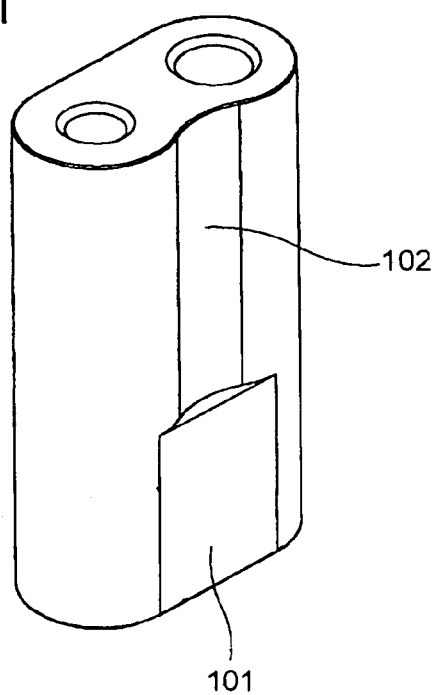
FIG. 11 is a perspective view of the CR-V3 battery.
Figure 12:
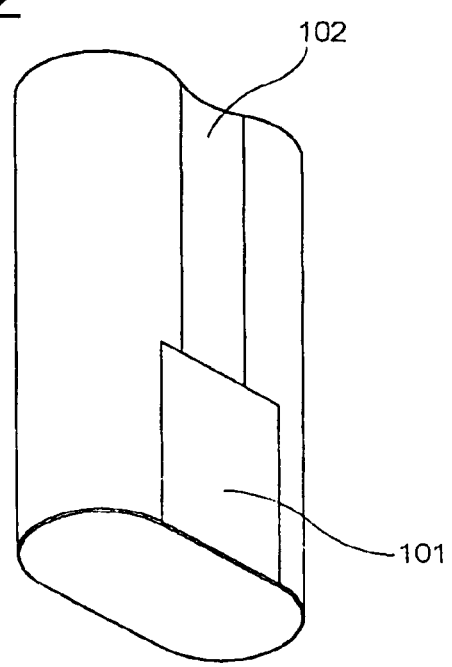
FIG. 12 is a perspective view of the CR-V3 battery shown in FIG. 11, viewed from a different angle.

As shown in FIGS. 6, 11 and 12, the CR-V3 battery has a shape which is interchangeable with two AA-size cells. The CR-V3 battery is provided on one side thereof with a flat portion 101 which extends from a position slightly below the center thereof to the bottom end of the CR-V3 battery, as viewed in FIGS. 11 and 12, and a groove portion 102 which extends from the top end of the flat portion 101 to the top end of the CR-V3 battery, as viewed in FIGS. 11 and 12. When the CR-V3 battery is inserted into the first partition 21 or the second partition 22 in the battery chamber BC, the CR-V3 battery is inserted from a specific end thereof (the top end as viewed in FIGS. 11 and 12) on which a positive terminal and a negative terminal are provided. Upon insertion of the CR-V3 battery into the first partition 21 or the second partition 22, the flat portion 101 and the groove portion 102 faces the partition wall 20a. As shown in FIGS. 6 and 7, a central portion of the partition wall 20a bulges in forward/rearward directions (upward/downward directions as viewed in FIGS. 6 and 7) perpendicular to the direction of insertion of the CR-V3 battery. The shape of the partition wall 20a prevents the CR-V3 battery from being inserted into the battery chamber BC back-to-front due to the groove portion 102 of the CR-V3 battery corresponding to the shape of the partition wall 20a (i.e., due to the side opposite to that of the groove portion 102 interfering with the partition wall 20a if inserted back-to-front), and further prevents the CR-V3 battery from being inserted into the battery chamber BC in the reverse direction (i.e., from the bottom end as viewed in FIGS. 11 and 12) due to the flat portion 101 of the CR-V3 battery interfering with the partition wall 20a if inserted in the reverse direction. In other words, each of the first partition 21 or the second partition 22, which are partitioned by the partition wall 20a, is formed to have a shape corresponding to the shape of an approximately upper half of the CR-V3 battery (approximately upper half as viewed in FIGS. 11 and 12).

Figure 1:
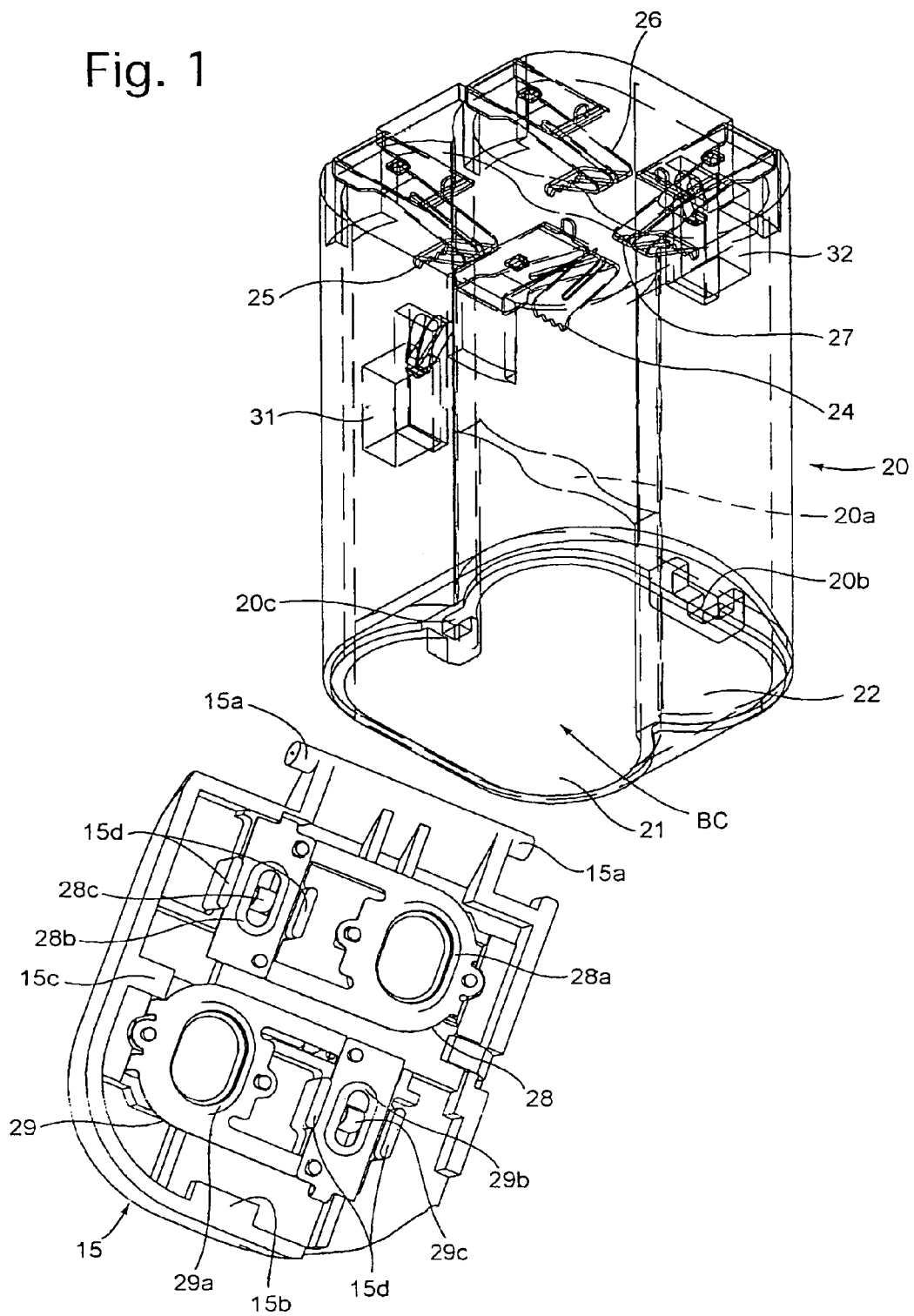
FIG. 1 is an exploded perspective view of a battery case and a battery chamber lid which constitute a battery chamber of a camera body according the present invention.

As shown in FIG. 1, the battery case 20 is provided at a bottom end surface thereof with a first lug engaging portion 20b and a second lug engaging portion 20c, and the battery chamber lid 15 is provided on an inner side thereof with a first lug 15b and a second lug 15c which are engaged in the first lug engaging portion 20b and the second lug engaging portion 20c, respectively, when the battery chamber lid 15 is closed.

The rear end of the battery chamber lid 15 is pivoted at a bottom wall 16 of the camera body 10. More specifically, the battery chamber lid 15 is provided at the rear end thereof with a pair of pivots 15a which project in right/left directions of the camera body 10 so that the pair of pivots 15a are rotatably supported by a pair of pivot support portions (not shown), respectively, which are formed on an inner surface of the bottom wall 16 of the camera body 10. The pair of pivot support portions that are formed on the bottom wall 16 are formed to allow the pair of pivots 15a to move in forward/rearward directions by a predetermined amount of movement.

In a state where the battery chamber lid 15 is closed, i.e., where the first lug 15b and the second lug 15c are respectively engaged in the first lug engaging portion 20b and the second lug engaging portion 20c, sliding the battery chamber lid 15 slightly forward relative to the camera body 10 causes the first lug 15b and the second lug 15c to be disengaged from the first lug engaging portion 20b and the second lug engaging portion 20c, respectively, thereby opening the battery chamber lid 15. To close the battery chamber lid 15, the first lug 15b and the second lug 15c only need to be engaged in the first lug engaging portion 20b and the second lug engaging portion 20c, respectively.

Figure 13:
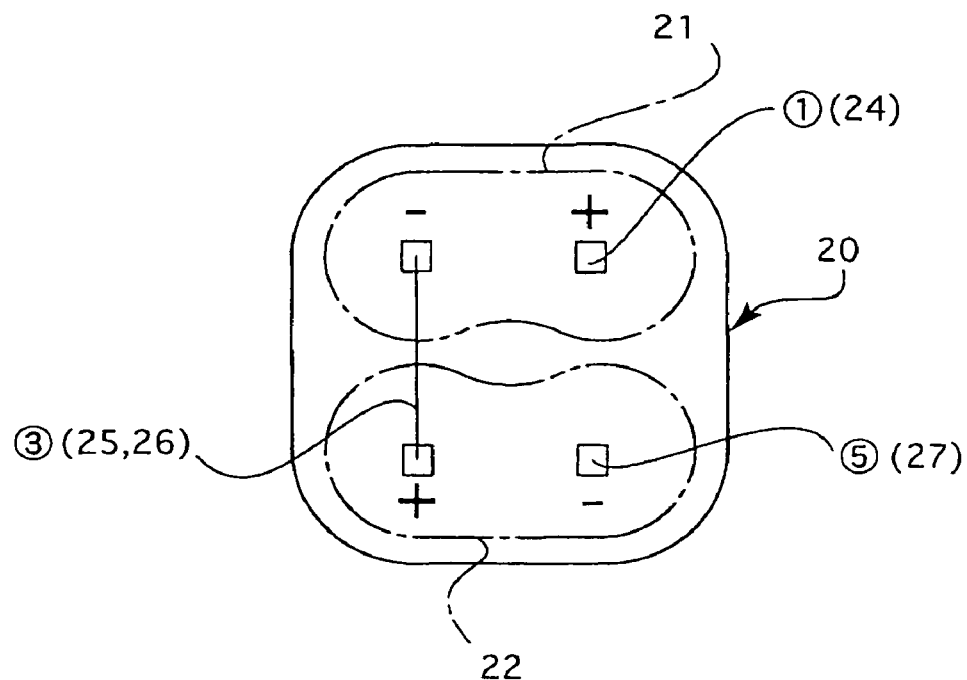
FIG. 13 is a schematic diagram of a top wall of the battery case, viewed from above of the battery case, showing the arrangement of a first contact, a third contact and a fifth contact on the top wall of the battery case.
Figure 14:
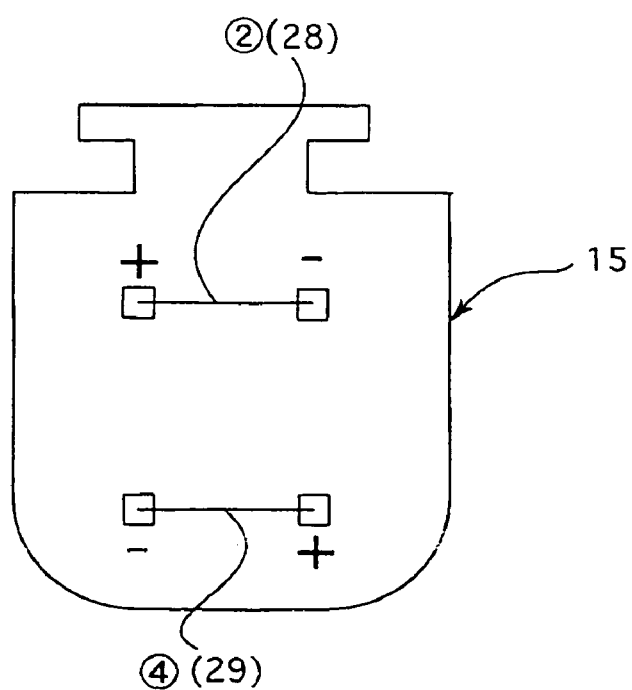
FIG. 14 is a schematic diagram of the battery chamber lid, viewed from the inside of the battery chamber, showing the arrangement of a second contact and a fourth contact on an inner surface of the battery chamber lid.

A first contact 24, a second contact 28, a pair of third contacts 25 and 26, a fourth contact 29 and a fifth contact 27 are alternately fixed to a top wall 23 of the battery case 20 and an inner surface of the battery chamber lid 15. Namely, the first contact 24, the pair of third contacts 25 and 26 and the fifth contact 27 are fixed to the top wall 23 of the battery case 20, while the second contact 28 and the fourth contact 29 are fixed to an inner surface of the battery chamber lid 15. FIGS. 13 and 14 are schematic diagrams showing the arrangement of the first through fifth contacts that are positioned alternately between opposite ends of the battery chamber BC in a longitudinal direction of the batteries (either four AA-size cells or two CR-V3 batteries) accommodated in the battery chamber BC. The first contact 24 and the fifth contact 27, which are positioned on the top wall 23 of the battery case 20, always serve as contacts from which a voltage is taken. The first contact 24 and the third contact 25 are positioned at the upper end of the first partition 21 in the battery chamber BC, while the third contact 26 and the fifth contact 27 are positioned at the upper end of the second partition 22 in the battery chamber BC. The first contact 24 and the third contact 25 contact the positive terminal of one AA-sized cell and the negative terminal of another AA-sized cell, respectively, when two AA-sized cells are inserted into the first partition 21, or contact the positive and negative terminals of the CR-V3 battery, respectively, when the CR-V3 battery is inserted into the first partition 21. The third contact 26 and the fifth contact 27 contact the positive terminal of one AA-sized cell and the negative terminal of another AA-sized cell, respectively, when two AA-sized cells are inserted into the second partition 22, or contact the positive and negative terminals of the CR-V3 battery, respectively, when the CR-V3 battery is inserted into the second partition 22. A conductive wire W is connected between the pair of third contacts 25 and 26 for conduction of electricity therebetween (see FIG. 4).

On the other hand, the second contact 28, which is fixed to the battery chamber lid 15, is provided with a first contacting portion 28a and a second contacting portion 28b which face the first contact 24 and the third contact 25, respectively, in a closed state of the battery chamber lid 15. Likewise, the fourth contact 29 is provided with a first contacting portion 29a and a second contacting portion 29b which face the third contact 26 and the fifth contact 27, respectively, in a closed state of the battery chamber lid 15.

When two AA-sized cells are inserted into the first partition 21, the first contacting portion 28a of the second contact 28 contacts the negative terminal of one AA-sized cell, while the second contacting portion 28b of the second contact 28 contacts the positive terminal of another AA-sized cell. Likewise, when two AA-sized cells are inserted into the second partition 22, the first contacting portion 29a of the fourth contact 29 contacts the negative terminal of one AA-sized cell, while the second contacting portion 29b of the fourth contact 29 contacts the positive terminal of another AA-sized cell.

The second contacting portion 28b of the second contact 28 is provided with a power-interruption prevention spring 28c which resiliently contacts the positive terminal of an AA-sized cell. Likewise, the second contacting portion 29b of the fourth contact 29 is provided with a power-interruption prevention spring 29c which resiliently contacts with the positive terminal of an AA-sized cell.

The battery chamber lid 15 is provided on an inner surface thereof on respective sides of the second contacting portion 28b with a pair of reverse-contact preventing projections 15d for preventing the negative terminal of an AA-sized cell from contacting with the power-interruption prevention spring 28c. The battery chamber lid 15 is provided on an inner surface thereof on respective sides of the second contacting portion 29b with another pair of reverse-contact preventing projections 15d for preventing the negative terminal of an AA-sized cell from contacting with the power-interruption prevention spring 29c.

When two CR-V3 batteries are inserted into the battery chamber BC, neither the second contact 28 nor the fourth contact 29 contacts any terminals of the CR-V3 batteries since the CR-V3 battery does not have any terminal at the bottom thereof.

Figure 8:
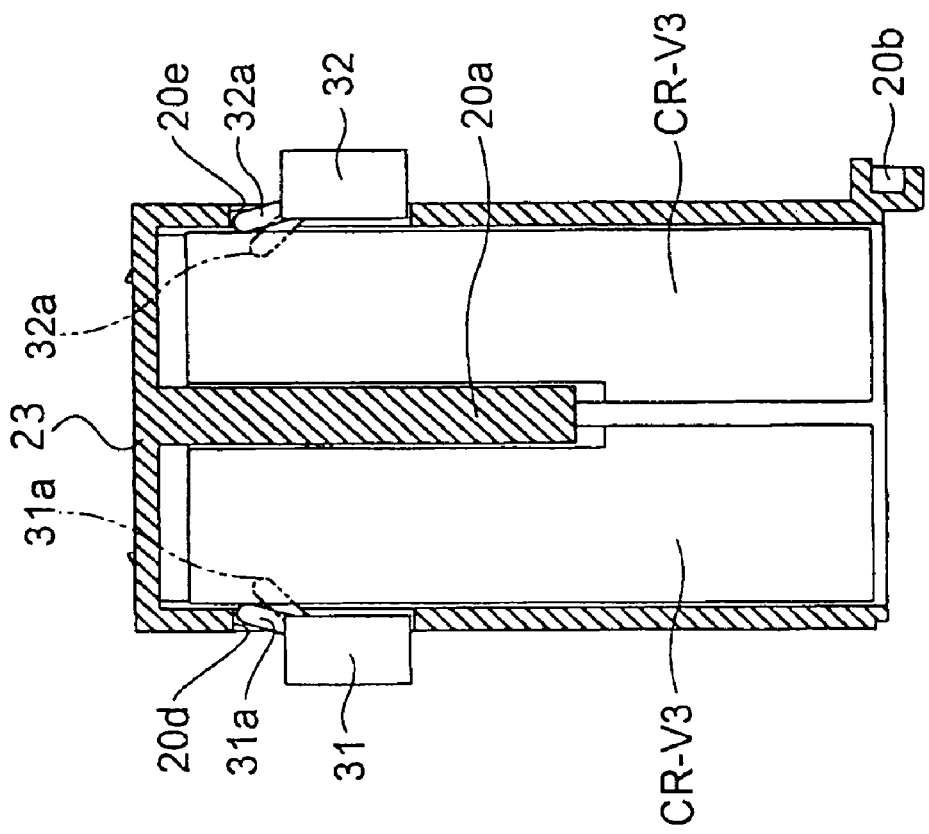
FIG. 8 is a cross sectional view of the battery case, viewed from the left side of the battery case, showing a state where two CR-V3 batteries are accommodated in the battery chamber.

As shown in FIG. 8, a first detection switch 31 for detecting the presence or absence of the CR-V3 battery in the first partition 21 is fixed to an outside wall of the battery case 20 adjacent to the first partition 21, and a second detection switch 32 for detecting the presence or absence of the CR-V3 battery in the second partition 22 is fixed to an outside wall of the battery case 20 adjacent to the second partition 22. The first detection switch 31 is provided with a movable switch pin (movable switch portion) 31a which projects into the first partition 21 through a through-hole 20d formed on an associated side wall of the battery case 20. The first detection switch 31 is OFF when the CR-V3 battery is not inserted into the first partition 21, i.e., when the movable switch pin 31a remains projecting into the first partition 21. In a state where the CR-V3 battery is inserted into the first partition 21, a side surface of the CR-V3 battery on which neither the flat portion 101 nor the groove portion 102 is formed presses the movable switch pin 31a toward the outside of the first partition 21 to thereby turn ON the first detection switch 31.

Likewise, the second detection switch 32 is provided with a movable switch pin (movable switch portion) 32a which projects into the second partition 22 through a through-hole 20e formed on an associated side wall of the battery case 20. The second detection switch 32 is OFF when the CR-V3 battery is not inserted into the second partition 22, i.e., when the movable switch pin 32a remains projecting into the second partition 22. In a state where the CR-V3 battery is inserted into the second partition 22, a side surface of the CR-V3 battery on which neither the flat portion 101 nor the groove portion 102 are formed presses the movable switch pin 32a toward the outside of the second partition 22 to thereby turn ON the second detection switch 32. The first detection switch 31 is not turned ON even if two AA-sized cells are inserted into the first partition 21. Likewise, the second detection switch 32 is not turned ON even if two AA-sized cells are inserted into the second partition 21.

As shown in FIG. 9, the camera body 10 is provided with a viewfinder optical system including a focusing screen 51, a pentagonal prism (pentaprism) 52 and an eyepiece 53. The camera body 10 is provided therein below the focusing screen 51 with a quick-return mirror (first mirror) 42. In a non-photographing state where the user can view an object through the eyepiece 53, object light rays which enter the camera body 10 through the photographing lens 40 mounted to the mount ring 11 are reflected upwards by the quick-return mirror 42 to be formed as an image on the focusing screen 51. Subsequently, this image is laterally reversed by the pentagonal prism 52 to be viewed as an erect image through the eyepiece. The camera body 10 is provided between the pentagonal prism 52 and the eyepiece 53 with a photometer element 54 which receives a part of the light rays emerging from an exit surface of the pentagonal prism 52. The camera body 10 is provided behind the quick-return mirror 42 with a focal plane shutter 45, an optical low-pass filter 47 and a CCD image sensor (image pick-up device) 48. The quick-return mirror 42 and the focal plane shutter 45 are driven by a conventional mirror/shutter drive mechanism 60.

In addition, in a non-photographing state where the user can view an object through the eyepiece 53, a part of the object light rays which have entered the camera body 10 through the photographing lens 40 passes through a half mirror portion formed at an approximate center of the quick-return mirror 42 to be incident on a sub-mirror (second mirror) 43 which is pivoted on a rear surface of the quick-return mirror 43. The light rays which are incident on the sub-mirror 43 are reflected downwards thereby to be incident on an AF sensor unit 44, e.g., a phase-difference detection AF sensor unit. Signals output from the AF sensor unit 44 are input to a CPU (controller/voltage detector/determining device) 46 which comprehensively controls the overall operation of the camera body 10. An AF drive mechanism 147 for driving a focusing lens group (not shown) included in the photographing lens 40, a diaphragm drive mechanism 148 for driving a diaphragm mechanism 41 provided in the photographing lens 40, and an exposure control circuit 49 to which the photometer element 54 is connected are connected to the CPU 46.

In addition, a photometer/release switch 61 and an external display (warning device/display device) 62 (e.g., an LCD panel) are connected to the CPU 46. The photometer/release switch 61 is operated by a release button (not shown) provided on a top-front surface of the grip portion 13. The external display 62 visually indicates various information.

Upon the release button (not shown) being half depressed, a conventional photometric operation and a conventional distance measuring operation commence via the photometer/release switch 61. Upon the release button being fully depressed, a conventional shutter release operation commences via the photometer/release switch 61.

The CCD image sensor 48 is connected to the CPU 46 via a CCD driver 63 and a clock generator 64. Image data output from the CCD image sensor 48 are stored in a memory 69 (e.g., a removable memory such as a flash memory) via an amplifier 65, an A/D converter 66, a signal processing circuit 67 and a data compression/non-compression circuit 68.

As shown in FIG. 9, the batteries (either four AA-sized cells or two CR-V3 batteries) accommodated in the battery chamber BC are connected to the CPU 46 via a DC/DC converter 71, while the first detection switch 31 and the second detection switch 32 are connected to the CPU 46.

The camera body 10 is provided therein with a backup battery 72 (see FIG. 9) independently of the batteries accommodated in the battery chamber BC. The backup battery 72 is connected to the CPU 46 via the DC/DC converter 71. The backup battery 72 can be a button type lithium battery or any other type of battery.

Each of the first through fifth contacts 24 through 29 that are fixed to the battery case 20 or the battery chamber lid 15 (i.e., the first through sixth contacts) is connected to the CPU 46 so that the CPU 46 obtains information on respective voltages between terminals.

Figure 10:
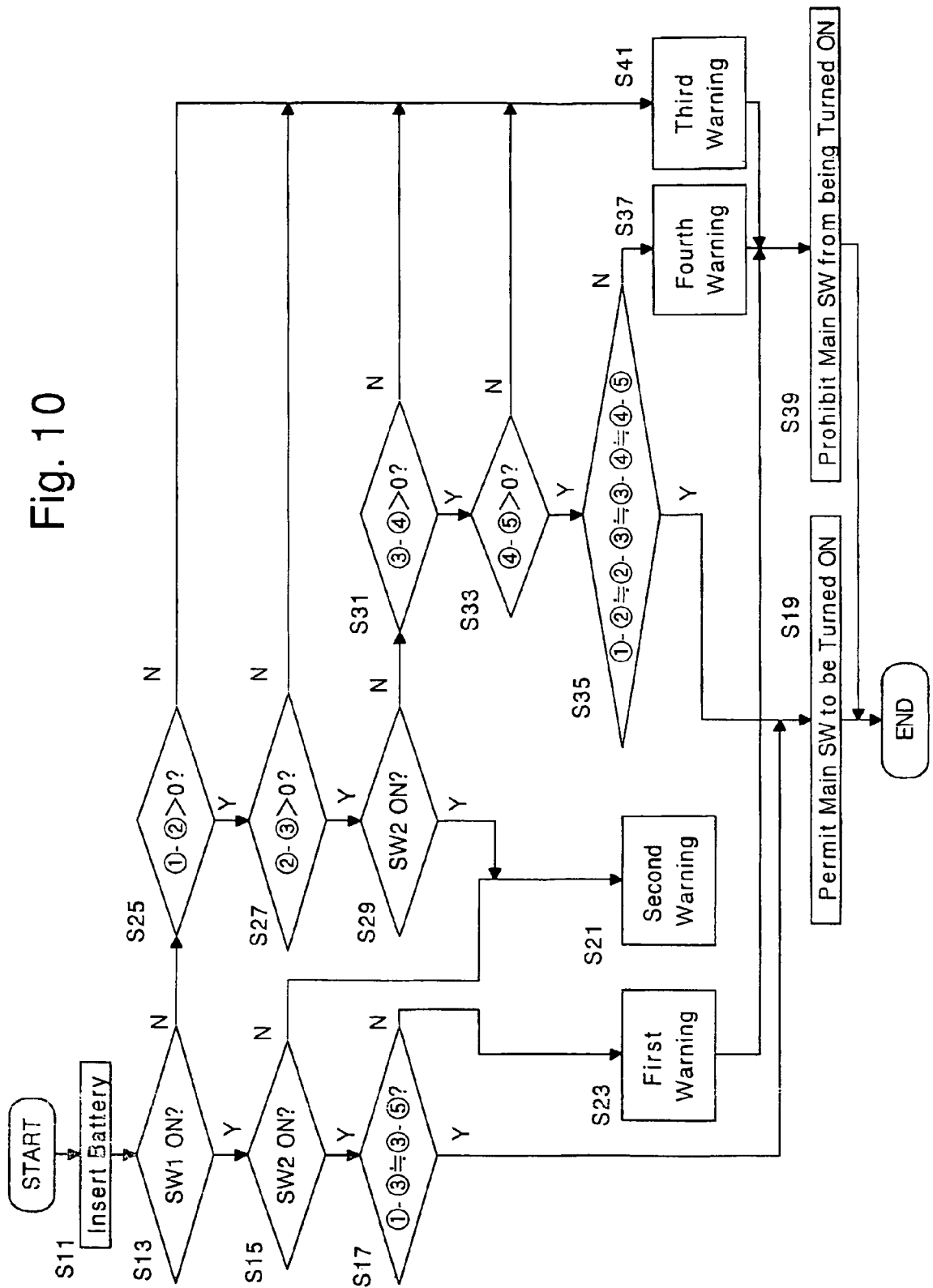
FIG. 10 is a flow chart showing a battery check process which is performed by a controller in the camera body shown in FIG. 2.

FIG. 10 shows a flow chart showing a battery check process. In the process shown in FIG. 10, it is determined whether the batteries accommodated in the battery chamber BC are appropriate or not on condition that batteries (AA-sized cells or CR-V3 batteries) are fully accommodated in the battery chamber CD, and thereafter, a predetermined warning indicator is indicated on the external display 62 while a main power switch (not shown) which is provided on top of the camera body 10 is prohibited from being turned ON (i.e., the batteries accommodated in the battery chamber BC are prohibited from being used as a main power source of the camera body 10) if it is determined that the batteries accommodated in the battery chamber BC are inappropriate. This battery check process shown in FIG. 10 is performed by the CPU 46 with power supplied thereto by the backup battery 72. The battery check process will be hereinafter discussed in detail.

Immediately after batteries are loaded into the battery chamber BC (step S11), it is determined whether the first detection switch 31 is ON (step S13). Control proceeds to step S15 if the first detection switch 31 is ON (if YES at step S13), or proceeds to step S25 if OFF (if NO at step S13). It is determined at step S15 whether the second detection switch 32 is ON. Control proceeds to step S17 if the second detection switch 32 is ON (if YES at step S15), or proceeds to step S21 if OFF (if NO at step S15). Accordingly, control proceeds to step S17 if both the first detection switch 31 and the second detection switch 32 are ON (i.e., if two of the CR-V3 batteries are inserted into the first partition 21 and the second partition 22, respectively).

Note that in FIGS. 9, 13 and 14, the first contact 24 is also designated as ①, the second contact 28 is also designated as ②, the pair of third contacts 25 and 26 are also designated as ③, the fourth contact 29 is also designated as ④, and the fifth contact 27 is also designated as ⑤, and these numerals are exclusively used to denote the first through fifth contacts ① through ⑤ in FIG. 10 for simplicity. At step S17 it is determined whether the voltage between the first contact (①) 24 and the third contact (③) 25 and the voltage between the third contact (③) 26 and the fifth contact (⑤) 27 are substantially the same as each other. If the voltages are substantially the same as each other (if YES at step S17), it is determined that the serviceable CR-V3 battery is inserted into each of the first partition 21 and the second partition 22 in the correct direction; based on this determination, the main power switch on the camera body 10 is permitted to be turned ON (step S19). Subsequently, control ends the battery check process. If the voltage between the first contact (①) 24 and the third contact (③) 25 and the voltage between the third contact (③) 26 and the fifth contact (⑤) 27 are not substantially the same as each other (if NO at step S17), control proceeds to step S23.

If it is determined at step S17 that the voltage between the first contact (①) 24 and the third contact (③) 25 and the voltage between the third contact (③) 26 and the fifth contact (⑤) 27 are not substantially the same as each other (if NO at step S17), a predetermined warning indicator (first warning indication) is indicated on the external display 62 (step S23). Subsequently, the main power switch on the camera body 10 is prohibited from being turned ON (step S39), and control ends the battery check process.

The first warning indication can be textual information, for example, "The camera possibly has a mixture of old and new batteries and/or damaged batteries inserted therein. Replace with new batteries.", is indicated on the external display 62 at step S23. Instead of such textual information, a sign or a mark which indicates a similar meaning can be indicated on the external display 62 at step S23.

If it is determined at step S15 that the second detection switch 32 is not ON (if NO at step S15), a predetermined warning indicator (second warning indication), which is different from the aforementioned warning indicator (first warning indication) of step S23, is indicated on the external display 62 (step S21). Subsequently, the main power switch on the camera body 10 is prohibited from being turned ON (step S39), and control ends the battery check process.

The second warning indication can be textual information, for example, "The camera possibly has different types of batteries inserted therein. Replace batteries only with the same type of batteries.", is indicated on the external display 62 at step S21. Instead of such textual information, a sign or a mark which indicates a similar meaning can be indicated on the external display 62 at step S21.

If it is determined at step S13 that the first detection switch 31 is not ON (if NO at step S13), it is determined whether the voltage between the first contact (①) 24 and the second contact (②) 28 is greater than zero volts (step S25). If the voltage is equal to or less than zero volts (if NO at step S25), a predetermined warning indicator (third warning indication) which is different from each of the aforementioned two warning signs or marks (first and second warning indications) at steps S21 and S23 are indicated on the external display 62 (step S41). Subsequently, the main power switch on the camera body 10 is prohibited from being turned ON (step S39), and control ends the battery check process.

The third warning indication can be textual information, for example, "Batteries possibly exhausted, or batteries possibly inserted in wrong direction. Check if each battery is inserted in the correct direction.", is indicated on the external display 62 at step S41. Instead of such textual information, a sign or a mark which indicates a similar meaning can be indicated on the external display 62 at step S41.

If it is determined at step S25 that the voltage between the first contact (①) 24 and the second contact (②) 28 is greater than zero volts (if YES at step S25), it is determined whether the voltage between the second contact (②) 28 and the third contact (③) 25 is greater than zero volts (step S27). If the voltage is equal to or less than zero volts (if NO at step S27), control proceeds to step S41 so that the aforementioned third warning indication is indicated on the external display 62. Subsequently, the main power switch on the camera body 10 is prohibited from being turned ON (step S39), and control ends the battery check process.

If it is determined at step S27 that the voltage between the second contact (②) 28 and the third contact (③) 25 is greater than zero volts (if YES at step S27), it is determined whether the second detection switch 32 is ON (step S29). If the second detection switch 32 is ON (if YES) at step S29, control proceeds to step S21 so that the aforementioned second warning indication is indicated on the external display 62. Subsequently, the main power switch on the camera body 10 is prohibited from being turned ON (step S39), and control ends the battery check process. If the second detection switch 32 is OFF (if NO at step S29), control proceeds to step S31.

At step S31, it is determined whether the voltage between the third contact (③) 26 and the fourth contact (④) 29 is greater than zero volts. If the voltage is equal to or less than zero volts (if NO at step S31), control proceeds to step S41 so that the aforementioned third warning indication is indicated on the external display 62. Subsequently, the main power switch on the camera body 10 is prohibited from being turned ON (step S39), and control ends the battery check process.

If it is determined at step S31 that the voltage between the third contact (③) 26 and the fourth contact (④) 29 is greater than zero volts (if YES at step S31), it is determined whether the voltage between the fourth contact (④) 29 and the fifth contact (⑤) 27 is greater than zero volts (step S33). If the voltage is equal to or less than zero volts (if NO at step S33), control proceeds to step S41 so that the aforementioned third warning indication is indicated on the external display 62. Subsequently, the main power switch on the camera body 10 is prohibited from being turned ON (step S39), and control ends the battery check process.

If it is determined at step S33 that the voltage between the fourth contact (④) 29 and the fifth contact (⑤) 27 is greater than zero volts (if YES step S33), the following four voltages: the voltage between the first contact (①) 24 and the second contact (②) 28, the voltage between the second contact (②) 28 and the third contact (③) 25, the voltage between the third contact (③) 26 and the fourth contact (④) 29 and the voltage between the fourth contact (④) 29 and the fifth contact (⑤) 27 are substantially the same as each other (step S35). If these voltages are substantially the same as each other (if YES at step S35), it is determined that two serviceable AA-sized cells of the same-grade (primary or secondary) are inserted into each of the first partition 21 and the second partition 22 in the correct direction; based on this determination, the main power switch on the camera body 10 is allowed to be turned ON (step S19). Subsequently, control ends the battery check process. If these voltages are not substantially the same as each other (if NO at step S35), the fourth warning indication is indicated on the external display 62 (step S37). Subsequently, the main power switch on the camera body 10 is prohibited from being turned ON (step S39), and control ends the battery check process.

The fourth warning indication can be textual information, for example, "The camera possibly has a mixture of old and new batteries, damaged batteries, and/or different grades of batteries (primary and secondary) inserted therein. Replace with new batteries.", is indicated on the external display 62 at step S37. Instead of such textual information, a sign or a mark which indicates a similar meaning can be indicated on the external display 62 at step S37.

The present invention can be applied to not only a digital camera such as the above described embodiment of the digital camera but also any other type of camera. In other words, the present invention can be applied to a conventional camera using silver-salt film, and can also be applied to any electronic device other than an electronic camera. Namely, the present invention can be applied to any electronic device using either at least two CR-V3 batteries or four or a larger even number of AA-size cells as a power source.

In addition, the present invention is not limited solely to the particular case where either at least two CR-V3 batteries or four or a larger even number of AA-size cells are used as a power source of an electronic device. Namely, the present invention can be applied to any electronic device having a battery chamber in which at least two battery packs of the same type each having a shape interchangeable with two cylindrical cells of the same type can be accommodated so that either the two battery packs or two sets of the two cylindrical cells can be selectively accommodated in the battery chamber, wherein each of the two battery packs includes a positive terminal and a negative terminal which are formed on only one end of the each battery pack, and wherein each of the two cylindrical cells includes a positive terminal and a negative terminal which are respectively formed on opposite ends of the each cylindrical cell, can be accommodated.

As can be understood from the foregoing, according to the present invention, in an electronic device such as an electronic camera including a battery chamber, in which at least two battery packs of the same type each having a shape interchangeable with two cylindrical cells of the same type can be accommodated so that either the two battery packs or two sets of the two cylindrical cells can be selectively accommodated in the battery chamber, a combination of different types of batteries can be prevented from being accommodated and used as a power source of the electronic device.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. An electronic device for which at least two different types of batteries can be selectively used as a power source, said electronic device comprising:

a battery chamber, in which at least two battery packs of the same type each having a shape interchangeable with two cylindrical cells of the same type can be accommodated so that either said two battery packs or two sets of said two cylindrical cells can be selectively accommodated in said battery chamber, wherein each of said two battery packs includes a positive terminal and a negative terminal which are formed on only one end of said each battery pack, and wherein each of said two cylindrical cells includes a positive terminal and a negative terminal which are respectively formed on opposite ends of said each cylindrical cell;

first through fifth contacts, positioned alternately between opposite ends of said battery chamber, in a longitudinal direction of said cylindrical cells or battery packs which are accommodated in said battery chamber, wherein said first through fifth contacts connect said two sets of said two cylindrical cells in series in a case where each of said two sets of said two cylindrical cells is accommodated in said battery chamber in the correct direction, and wherein in the case where said two battery packs are accommodated in said battery chamber, said third contact is in electrical contact with said negative terminal of one of said two battery packs and said positive terminal of the other of said two battery backs while said first contact and said fifth contact are in electrical contact with said positive terminal of said one of said two battery packs and said negative terminal of said other of said two battery backs, respectively;

two detection switches which are turned ON only when said two battery packs are accommodated in said battery chamber in the correct direction, respectively;

a voltage detector capable of detecting each of a first voltage between said first contact and said second contact, a second voltage between said second contact and said third contact, a third voltage between said third contact and said fourth contact, a fourth voltage between said fourth contact and said fifth contact, a fifth voltage between said first contact and said third contact, and a sixth voltage between said third contact and said fifth contact; and a controller which allows either said two sets of said two cylindrical cells or said two battery packs that are accommodated in said battery chamber to be used as said power source only in one of the following two cases:

a first case where both said two detection switches are ON while it is determined via said voltage detector that said fifth voltage and said sixth voltage are substantially the same as each other; and a second case where both said two detection switches are OFF while it is determined via said voltage detector that each of said first voltage, said second voltage, said third voltage and said fourth voltage is greater than zero volts and that said first voltage, said second voltage, said third voltage and said fourth voltage are substantially the same as each other.

2. The electronic device according to claim 1, further comprising:

a warning device; and a backup battery provided independently of said two sets of said two cylindrical cells and said two battery packs, wherein, in a case other than said first and second cases, said controller issues a warning that inappropriate batteries are accommodated in said battery chamber via said warning device while using said backup battery as a power source, and prohibits said inappropriate batteries from being used as a power source.

3. The electronic device according to claim 2, wherein said warning device comprises a display device, and wherein said controller drives said display device to indicate said warning in said case other than said first and second cases.

4. The electronic device according to claim 1, wherein said each cylindrical cell comprises an AA-sized cell, and wherein said each battery pack comprises a CR-V3 battery.

5. The electronic device according to claim 4, wherein each of said two detection switches comprises a movable switch portion which projects into said battery chamber, said movable switch portion being pressed by a side surface of associated said CR-V3 battery when said associated CR-V3 battery is inserted into said battery chamber.

6. The electronic device according to claim 1, wherein said electronic device comprises a camera.

7. The electronic device according to claim 1, wherein said battery chamber is partitioned into a first partition and a second partition, in each of which either said two cylindrical cells or one of said two battery packs can be accommodated, wherein said electronic device comprises a battery chamber lid for opening and closing said battery chamber, and wherein said second contact and said fourth contact are fixed to an inner surface of said battery chamber lid in a manner to face said first partition and said second partition, respectively, in a closed state of said battery chamber lid.

8. The electronic device according to claim 6, wherein said battery chamber is formed in a grip portion of said camera.

9. The electronic device according to claim 5, wherein two of said CR-V3 batteries are accommodated in said battery chamber with respective grooves portions of said two of said CR-V3 batteries facing each other.

10. An electronic device for which at least two different types of batteries can be selectively used as a power source, said electronic device comprising:

a battery chamber, in which at least two battery packs of the same type each having a shape interchangeable with two cylindrical cells of the same type can be accommodated so that either said two battery packs or two sets of said two cylindrical cells can be selectively accommodated in said battery chamber; and a detector for detecting whether said two sets of said two cylindrical cells or said two battery packs are accommodated in said battery chamber.

11. The electronic device according to claim 10, wherein said each cylindrical cell comprises an AA-sized cell, and wherein said each battery pack comprises a CR-V3 battery.

12. An electronic device for which at least two different types of batteries can be selectively used as a power source, said electronic device comprising:

a battery chamber, in which at least two battery packs of the same type each having a shape interchangeable with two cylindrical cells of the same type can be accommodated so that either said two battery packs or two sets of said two cylindrical cells can be selectively accommodated in said battery chamber;

a voltage detector capable of detecting a voltage for each of said two sets of said two cylindrical cells or said two battery packs which are accommodated in said battery chamber; and a determining device which determines that different types of batteries are accommodated in said battery chamber in the case where all of said voltages detected by said voltage detector are not substantially the same.

13. The electronic device according to claim 12, wherein, in a case where said determining device determines that said different types of batteries are accommodated in said battery chamber, said different types of batteries are prohibited from being used as a power source.

14. The electronic device according to claim 12, wherein said each cylindrical cell comprises an AA-sized cell, and wherein said each battery pack comprises a CR-V3 battery.

* * * * *